United States Patent [19]

Yackel, Jr. et al.

[11] Patent Number: 4,517,218

[45] Date of Patent: May 14, 1985

[54] PREPARATION OF IMITATION FOODS OF A TENDER TEXTURE FROM PROTEINACEOUS EXTRUDATES

[75] Inventors: Walter C. Yackel, Jr., Oreana; William E. Hebenstreit, Decatur, both of Ill.

[73] Assignee: A. E. Staley Manufacturing Company, Decatur, Ill.

[21] Appl. No.: 534,450

[22] Filed: Sep. 21, 1983

Related U.S. Application Data

[63] Continuation of Ser. No. 339,811, Jan. 15, 1982, abandoned.

[51] Int. Cl.³ ................................................ A23J 3/00
[52] U.S. Cl. .................................... 426/656; 426/657; 426/516; 426/802; 426/104
[58] Field of Search ............... 426/104, 656, 657, 802, 426/516

[56] References Cited

U.S. PATENT DOCUMENTS

| | | | |
|---|---|---|---|
| 3,488,770 | 1/1970 | Atkinson | 426/656 X |
| 3,754,926 | 8/1973 | Strommer et al. | 426/656 |
| 3,886,299 | 5/1975 | Feldbrugge et al. | 426/656 |
| 3,950,564 | 4/1976 | Puski et al. | 426/516 |
| 3,968,268 | 7/1976 | Sair et al. | 426/656 X |
| 4,042,715 | 8/1977 | Wenger et al. | 426/656 X |

*Primary Examiner*—Robert Yoncoskie
*Attorney, Agent, or Firm*—Philip L. Bateman; James B. Guffey; Forrest L. Collins

[57] ABSTRACT

Vegetable protein extrudates substantially free from internal voids with a densely compacted stratum of laminae may be used to prepare imitation products which simulate the tender, succulent textural properties of freshly cooked natural products such as cooked mushrooms and shellfish products. The extrudates are prepared by the thermoplastic extrusion of proteinaceous feed material slurry containing more than 50% by weight water under conditions which prevent internal void formation and provide a highly laminated extrudate structure. The textural properties are imparted to the extrudate by retorting in the presence of pH 5.5–6.5 saline solutions.

13 Claims, No Drawings

PREPARATION OF IMITATION FOODS OF A TENDER TEXTURE FROM PROTEINACEOUS EXTRUDATES

CROSS-REFERENCE TO RELATED APPLICATION

This application is a continuation of U.S. patent application Ser. No. 06/339,811 filed Jan. 15, 1982, now abandoned.

BACKGROUND OF THE INVENTION

Imitation textured products, prepared from low cost raw material, have been proposed to replace the more costly natural food products. The most prolific development has occurred within the field of imitation meat products.

The early synthetic meat-like extrudate technology involved forming a vegetable protein slurry (e.g. soy flakes and water), mechanically working the soy flour and water within the barrel of an extruder under elevated pressures and temperatures to form a molten mass and extruding the molten mass through an orifice into the atmosphere. This resulted in a puffed extrudate which simulated the fibrous character of meat products.

Subsequently issued patents modified the extrusion process to produce a non-expanded, meat-like extrudate. U.S. Pat. No. 3,886,299 by Feldbrugger et al. discloses a dense, substantially unpuffed fibrous, meat-like product. The Feldbrugger et al. process initially entails forming a dough of the water and proteinaceous material. The dough is then fed to an extruder equipped with a heated channel of decreasing volume adapted to simultaneously elongate and thermally coagulate the dough and to release the compression without forcing the dough through a die while maintaining the pressure drop below 100 psi. Although Feldbrugger et al. infer the water content may broadly range between 20% and 65%, the working examples show that from 25% to 38% water is needed to form the fibrous dough and meat-like product. In U.S. Pat. No. 3,950,564 by Puski et al. an extrusion process for producing a dense, fibrous, meat-like substitute is also disclosed. The dense, fiberous extrudate of Puski et al. is reportedly achieved by passing a protein 50–70%/water 30–50% mix through a plurality of zones decreasing pressures and temperatures. The final zone, preceding the shaping die, is reportedly maintained at a pressure of less than 100 psi and a temperature less than 212° F. Puski et al. speculate that the higher moisture content, reduced temperatures, extensive shearing action, open space within the extruder barrel, step-wise pressure reduction contributes to textural improvements. Puski et al. stresses that the configuration of the annular spacing between adjacent screw sections of the final, notched, tapered screw or cone section of the extruder and alignment of the open section within the barrel preceding the extrusion die head contributes to an extrudate having a more elongated, fibrous mass, plate-like structure.

In the preparation of these meat-like extrudates, the extruder design, extrusion conditions and the composition of the feed materials are especially adapted to produce a fibrous, meat-like structure in the finished product. Considerable mechanical working and exposure of the molten mass to frictional forces contributes to the creation of the desired fibrous character. Although this extrusion technology is suitably adapted for preparing synthetic meat-like products, it is inapplicable to the preparation of imitation vegetable products.

In view of the high cost of many vegatable products such as mushrooms, the inventors desired to produce imitation vegetable products from a low-cost raw material. In pursuit of this objective, the inventors discovered that under certain carefully controlled extrusion conditions it was possible to produce an extrudate which simulated the eating, flavor and textural attributes of a high quality vegetable product.

DESCRIPTION OF THE INVENTION

According to the present invention there is provided a method for preparing imitation vegetable products from proteinaceous materials which comprises: transferring under superatmospheric pressure and a temperature between about 130° C. to about 160° C. a molten mass containing proteinaceous material and at least 110 parts by weight water for each 100 parts by weight proteinaceous material into a confined cooling zone; cooling the molten mass within the cooling zone to a temperature below the boiling point of the water contained within said mass; solidifying the flowable mass by extruding the cooled mass into a zone maintained at a temperature below the soldification temperature of the flowable mass; piercing the solidified extrudate into the configuration of an imitation vegetable piece and imparting the textural characteristics of a vegetable product to the pierced extrudate by heating the pierced extrudate under superatmospheric pressure in the presence of a saline solution at a temperature greater than 95° C.

Proteinaceous materials used to prepare the imitation vegetable pieces may be obtained from a variety of protein sources. Illustrative thereof are proteins derived from animal, poultry, vegetable, microbial, marine, etc. sources. Exemplary proteinaceous materials include animal proteins such as milk, whey, keratin, globulins, etc., fish proteins such as fish meal, proteinaceous materials obtained from microbial sources (e.g. yeast, etc.) and vegetable proteins. Advantageously the protein materials have a protein content of at least 40% by weight (d.s.b.) and are derived from a vegetable source and particularly those obtained from vegetable seed materials such as wheat, corn, oats, rye and legumes. Proteinaceous materials obtained from defatted leguminous materials such as soybean, peanut, cottonseed, etc. are particularly effective source materials for producing the imitation vegetable products of this invention. The preferred proteinaceous materials are soy proteins and particularly those which contain (on a dry solids basis) at least 70% by weight soy protein such as soy protein concentrates and isolates with the soy protein concentrate being an especially suitable raw material.

The amount of water combined with the proteinaceous materials affects the textural characteristics of the finished product. If less than 110 parts by weight water for each 100 parts by weight protein material is used, excessive mechanical working, shearing and frictional forces will occur within the extrusion mass. Such excessive forces will result in the development of a tough, fibrous, meat-like texture. Conversely, an excessive water level (e.g. greater than 150 pbw) yields an extrudate product of insufficient structural strength to retain its integrity when retorted in saline solutions. To achieve the textural characteristics of a vegetable material product the water content of the extrusion mix will typically range from 55% to about 60% of the total protein material and water weight. On a 100 parts proteinaceous material weight basis (d.s.b.) the extrusion mix will advantageously contain from 100 to about 135 parts water for each 100 parts by weight proteinaceous material and preferably about 115 to about 125 parts by weight water.

Other additives such as preservatives, coloring, flavoring, sweetening, plasticizing, texturizing, etc. agents may be incorporated into the base mix prior to extrusion or alternatively to the saline solution. Such additives may be used to modify the desired textural, color and organoleptic properties of the imitation vegetable product. If such additives are incorporated into the extrusion mix they will generally comprise less than 15% and most typically less than 10% of the protein material dry substance weight. Metal salt additives such as calcium chloride, sodium chloride, etc. may be incorporated into the extrusion mix to satisfy the subsequent saline solution requirements. Such metal salt additions tend toughen the texture of the extrudate and are usually omitted from the extrusion mix in the manufacture of the tender textured imitation vegetable products. Organic and inorganic coloring additives can also be effectively included in the extrusion mix to impart the desired coloring affect to the imitation vegetable premix.

Plasticizing agents such as edible oils, lecithin, polyhydric alcohols (e.g. glycerol, propylene glycol, sorbitol, mixtures thereof and the like) may be effectively included to enhance pliability and tenderness of the extrudate. The most appropriate plasticizing level will depend upon the physical, chemical and organoleptical properties of the plasticizers. Plasticizing additives such as the polyhydric alcohols may be satisfactorily used at higher concentrations than other plasticizing additives such as lecithin. In general, the added plasticizing agent level will normally be less than 25 pbw for each 100 parts by weight proteinaceous material. The polyhydric plasticizing additives will effectively increase the water boiling point which permits higher temperatures to be used in the cooling and extruding of the product. The plasticizing additive levels will advantageously range from about 5 to about 15 pbw for polyhydric alcohols and about 0.25 to about 2 pbw for lecithin.

Flavoring agents thermally stable under the extrusion conditions herein may also be incorporated into the extrusion premix. The thermally unstable flavoring and coloring additives are advantageously omitted from the extrudates.

The feed materials (including the proteinaceous material, water and other desired additives) are charged to the extruder. The feed materials are advantageously converted into a homogenous mass prior to their submission to temperatures of 130° C. or higher. Conventional mixing equipment or adequate premixing techniques within the extruder prior to the conversion of the feed materials into a molten mass may be used for this purpose. Further improvements in textural properties are obtained by initially placing a major portion of the water-soluble protein into aqueous solution prior to the mechanical working of the feed materials to a temperature of 130° C. or higher. In the preferred embodiments of the invention, the raw materials are initially mixed together at a temperature of less than 40° C. before being exposed to temperatures of 130° C. or higher.

The homogeneous admixture is then converted to a molten mass under superatmospheric pressures at a temperature ranging from 130° C. to about 160° C. The molten mass-forming temperature and extrusion conditions are carefully controlled so as to develop the imitation vegetable textural properties. Excessively low extrusion temperatures and water levels create viscosity problems within the cooling zone and a grainy, fibrous textured product. Conversely excessive charring and product toughness arise from prolonged exposure at temperatures in excess of 155° C. Advantageously, the extrusion temperatures range from between 135° C. to 155° C. The preferred operational temperatures range from about 140° C. to about 150° C.

The extrudates used to prepare the imitation vegetable products are specifically adapted to minimize the amount of mechanical working, shearing and frictional forces placed upon the protein composition. The total amount of power required to force the product through the extruder provides a guideline for ascertaining the extent of mechanical working, shear and friction. Extrusion processes which extensively work, shear and cause considerable friction require more power than those operated under low working, shearing and frictional conditions. Extrusion devices requiring less than 100% operational increase in power over those normally required to operate the extruder on a no-load basis are advantageously used to produce the extrudates of this invention. Compression and/or twin screw extruders such as conventionally used by the plastic industry have been found to be particularly effective for this purpose. Under the preferred operational conditions, extruders which require less than a 30% power increase (usually between about 5% to about 20% increase) are used to prepare the extrudates.

The molten mass is extruded under conditions which prevent the volatile constituents from forming a porous or puffed extrudate. Puffing of the extrudate is avoided by cooling the molten mass to a temperature below the boiling point of the volatile constituents prior to exposing the extrusion mass to ambient temperatures and pressures. The cooling temperature should be maintained sufficiently high so as to permit the cooled mass to continuously flow through the cooling zone but low enough to prevent puffing. The required cooling temperatures will depend upon the actual boiling point of the volatile constituents of the extrusion mix. If the extrusion mix contains additives that tend to elevate the water boiling point (e.g. metal salts, plasticizers, polyhydric alcohols, sugars, etc.), the cooling zone temperature may exceed the normal water boiling point (i.e. 100° C.) by 10° C. or higher. For most extrudates, the cooling zone will typically be maintained from about 35° C. to 100° C., and most typically within the 45° C.–90° C. range.

The cooling zone is suitably designed so as to confine the mass under superatmospheric pressure until it can be extruded into an ambient zone without puffing. Conventional plastic extruders equipped with a water-jacketed cooling die assembly bolted directly onto the exit plate are satisfactory for this purpose.

The shape and configuration of the opening cooling assembly orifice should be designed to minimize the mechanical working and frictional forces. For most operations the cooling assembly cross-sectional area will range from about 10% to about 100% of the average cross-sectional area of the extruder barrel (most typically from about 25% to about 50%). Orifices adapted to produce extrudates in ribbons or sheets measuring from about 0.05 to about 0.25 inches thick and preferably from about 0.08 to about 0.15 inches are particularly effective.

If desired the extrusion device may be equipped with a plurality of zones, each of which is operated at different temperature and pressure. For example, the first zone may be operated to provide a homogeneous admixture of the proteinaceous material and water, the next or succeeding zones adapted to convert the admixture into a hot, fluid, molten mass of material and the final zone to cool the product below the boiling temperature of the volatile constituents.

After sufficient cooling, the flowable and cooled mass is solidified. This can be normally accomplished by extruding the cooled mass into an ambient zone. In the preferred embodiment of the invention, the extrudate is forced through a cooling die assembly which is adapted to yield a flat belt- or sheet-like extrudate measuring approximately 0.08 to about 0.15 inch thick. The extruded product can be easily cut or stamped into the desired piece during this processing stage. The solidified extrudates are most generally characterized by a non-fibrous, smooth surface appearance. The high water-retention level has a plasticizing effect upon the solidified product. This imparts a flexible and pliable character to the solidified product. The extrudates have a sufficiently high tensile strength and low elasticity to permit mechanical drawing of the product through a cutting device. In contract to the commercially available, unpuffed, retortable extrudates which often have void spaces in excess of 0.5 void cm$^3$/mass cm$^3$, extrudates of less than 0.1 void cm$^3$/mass cm$^3$ may be prepared under this invention.

The extrudates issuing from the cooling zone are susceptible to microbiological spoilage. Spoilage can be alleviated by incorporating a preservative into the base formula, cooking the solidified extrudate or by drying the extrudate. The inclusion of preservatives is generally undesirable since such preservatives will often adversely affect the textural and taste qualities of the imitation vegetable product. Drying the extrudates will effectively inhibit or prevent microbiological or enzymatic degradation and is useful when the extrudate pieces are intended to be stored. Reducing the total water content of the extrudate to less than 15% (most typically from about 10% to about 15%) will generally be sufficient to microbiologically protect the dry extrudate against microbial spoilage.

The solidified extrudates are pierced into the configuration of the desired imitation vegetable product. The term "piercing" is intended to broadly encompass a wide variety of techniques for cutting, partially cutting, scoring, stamping, perforating, etc. the extrudate product into the shape of a vegetable product or vegetable piece. The piercing device may be designed to completely cut or partially cut the extrudate. If the extrudate is partially cut or stamped, the initial scoring of the extrudate should be sufficient to permit its subsequent separation. Partial cutting can be conveniently used when it is desired to dry the piece prior to the retort cooking step. Upon impact, separation of vegetable pieces from the extrudate can be achieved by breaking or shattering the dry extrudate along its scored lines.

Cooking the extrudate under pressure in the presence of a saline solution adjusted to a pH ranging from about 5.6 to about 6.4 is necessary in order to impart the textural attributes of an imitation vegetable product to the extrudate. The extrudates typically absorb or retain from about 2 to about 5 times their dry weight in water. The saline solution requirements may be provided by pre-soaking the extrudate pieces in a saline solution followed by retorting of the extrudate within the prescribed pH range. Alternatively the extrudate may be combined with a pickling brine adjusted to the appropriate pH, sealed in a container and cooked under pressure to provide a canned imitation vegetable product.

A sufficient amount of a metal salt should be present during the cooking to impart the desired vegetable product textural attributes to the extrudate. Relatively dilute saline solution (e.g. 0.05M or higher) are generally sufficient for this purpose. Excessive salinity (e.g. 1M) will not generally adversely affect the textural properties but will result in an undesirable salty taste. Pragmatically the saline concentration will typically range from about 0.1M to about 0.3M and most typically from about 0.15M to about 0.25M.

The pH at which the extrudate pieces are cooked under pressure also has a significant affect upon texture. Excessively low pH conditions result in a fibrous texture while a pH of 6.5 or greater produces an excessively mushy or soft texture. Retort cooking at a pH ranging from about 5.5 to about 6.5 (preferably at a pH 5.8–6.3) will generally impart the desired vegetable textural characteristics.

Another significant factor affecting the textural properties is the retort cooking temperature. Although temperatures of less than 110° C. may be used under prolonged cooking periods, the cooking temperature advantageously ranges from about 115° C. to about 135° C. with particularly effective results being achieved at cooking temperatures ranging from about 115° C. to about 125° C.

The imitation vegetable products produced in accordance with the present invention differ from conventional meat extrudates. The dry extrudates are relatively free from internal voids (e.g. less than 15% of the mass and most typically less than 8%). Notwithstanding the compacted dense extrudate structure, the extrudates are capable of adsorbing several times their dry weight in water. When retorted in the presence of saline solutions, the extrudates will normally adsorb water in an amount of at least 2.5 the extrudate dry weight (e.g. 2.5–5) and advantageously from about 3 to about 4 times their dry weight. The highly compacted extruded product is comprised of a plurality of concentric lamina, each of which is aligned substantially parallel to the planar surface of the extrudate (i.e. along longitudinal axis of extrusion). In the dry form, a cross-sectional cut transverse to the direction of extrusion, macroscopically reveals a product substantially free of visible voids including appreciable separations or void spaces between the laminae. Visually the extrudates appear to be a solid piece. When hydrated by retorting, the laminated structure within the extrudate becomes more readily discernible. Unlike the dry extrudates which appear substantially free from a multiplicity of lamina, the retorted and hydrated product macroscopically reveals a plurality of very thin laminae. In the retorted and hydrated form, the lamina can be separated (e.g. by peeling) into distinct lamina which will individually measure less than about 0.5 mil in thickness. Advantageously the lamina which form the laminated structure will have a thickness of less than 0.3 mil and preferably less than 0.1 mil in thickness. The retorted and hydrated extrudates are also generally characterized as a pliable and tender structure which possesses sufficient physical and structural integrity to resist disintegration and laminate separation during and after retorting.

EXAMPLE

Imitation mushroom pieces were prepared by thermoplastic extrusion of a soy protein concentrate under non-expanding extrusion conditions, cutting the extrudate in the shape of mushroom pieces and retorting the pieces in brine at a pH 5.8.

The non-expanded extrudates were prepared by preblending one hundred pounds of soy protein concentrate [1] with 135 pounds water, metering the preblended mixture into a Bonnet extruder (Model $2\frac{1}{4}''$) at a rate of 60 pounds per hour. The first section of extruder (10 inches) was maintained at 38° C., the second at 65° C. and the third and fourth sections at 150° C. The cooling section was fabricated from two carbon-hardened flat steel sheets each measuring 1 inch thick by 8 inches by 6 inches. One of the flat steel sheets was machined on one side along the center of its longitudinal axis into a cavity measuring 3/32 inch thick through its entire length. Three cooling holes $\frac{1}{2}$ inches ID were bored through each sheet at intervals of $\frac{1}{2}$ inch, 3 inches and 5 inches from the cooling zone exit with each bore being positioned about 174 inches from the cooling zone cavity. The cooling pipes were equipped with adapters to receive heated water as a coolant. Assembled, the cooling zone provided a ribbon-shaped cavity measuring 6 inches wide, 3/32 inches high and 6 inches in length.

[1]-PROCON 2000-Manufactured and sold by the A. E. Staley Manufacturing Company, Decatur, Ill.

A forming section (adapted to be bolted directly onto the extruder head and the cooling section) was made from carbon-hardened steel piece measuring 6 inches wide, 5 inches high and 5 inches in length. The orifice of the forming section was adapted to fit onto the extruder head and machined to the same orifice size as the extruder head orifice (1 inch ID). The remaining orifice portions of the forming section was designed to radiate inwardly in an eliptical funnel-shaped form so as to coincide with the configuration of the cooling section orifice. Cooling water at 38° C. was used as a coolant in the cooling zone.

The extruder and cooling assembly were preheated by heating the sections to the operational temperature and thereafter allowing a small amount of water to pass through the extruder. After steam had issued from the cooling sections for 5 minutes, the wate and soy concentrate premix was fed to the extruder at a rate of 60 pounds/hour. The hot molten protein exiting from the extruder passed through the forming section into cooling sections. The product exited from the cooling zone at 65° C. and contained about 70% moisture. The extruded product was very flexible with sufficient tensile strength to be recovered upon drawing reels.

The power requirements for the unloaded or empty extruder was 10 amps with a 10% increase in power (11 amps) being required to operate during the product extrusion.

The ribbon-shaped continuous extrudate (6 inches wide and $\frac{1}{8}$ inches height) was scored to a depth of 0.10 inches with a cutting die of a mushroom configuration and oven-dried (180° F.) to moisture content of 6%. Separation of the mushroom pieces was achieved by impact shattering of the sheets in a rotary tumbler which caused the mushroom pieces to break cleanly along the scored lines into discrete mushroom pieces.

The volume, weight and true density (e.g. picnometer) of the dried mushroom pieces were then determined. The bulk density of the mushroom pieces was 1.28 g/cm$^3$±0.05 and a true density (by air picnometer) was 1.35 g/cm$^3$. The specific volume of the bulk piece was 0.781 cm$^3$/gram and the specific volume of the true density was 0.740 cm$^3$/g. A void volume of 0.052 void cm$^3$/mass cm$^3$ was then determined by the following equation: ps $$(B-T)/B=V$$

wherein B represents the bulk specific volume cm$^3$/g. T is the true specific volume in cm$^3$/g and V equals the void volume cm$^3$/mass cm$^3$. A commercial meat-like retortable extrudate was likewise analyzed. The void volume of this product was 0.604 void cm$^3$/cm$^3$ mass.

The dry mushroom pieces were then boiled in a hydrating brine consisting of 1000 pbw of water, 12.5 pbw salt, 0.5 pbw citric acid and 200 pbw pieces at a pH 5.8 for one hour. The unadsorbed brine was drained from the cooked hydrated pieces and the drained pieces were then filled into 603×700 cans followed by a filling of the cans with a 65° C. pack brine consisting of 1000 pbw water, 12.5 pbw salt, 0.5 pbw citric acid, 1.29 pbw McCormick #30083 flavor and PFW mushroom flavor #68060. The contents were then exhausted at 85° C., cans closed and retorted for 75 minutes at 241° F.

Analysis of the retorted pieces indicated the pieces had adsorbed 3.5 times their dry weight in brine. The pH of retorted pieces was 5.9. The retorted pieces closely simulated the appearance as well as the succulent texture and taste of natural mushroom pieces. The pieces were unformly dispersed as individual pieces throughout the packing brine. Upon storage for several months, the imitation mushroom pieces retained the freshness and quality of the freshly packed product without any evidence of physical, chemical, enzymatic or microbial deterioration.

What is claimed is:

1. A method for providing cooked food pieces having non-fibrous texture which simulate the tender and succulent textural properties of freshly cooked natural products; said method comprising preparing a homogeneous fluid molten mass from a mixture comprising a proteinaceous material and water, wherein said mixture contains for each 100 parts by weight proteinaceous material at least 110 parts by weight water, by subjecting said mixture, at superatmospheric pressure and at a temperature of from about 130° C. to about 160° C., to mechanical working, shearing and frictional forces which are sufficient to form said homogeneous fluid molten mass but which are insufficient to impart a tough fibrous meat-like character to the aforementioned cooked food pieces; moving the mass into a confined cooling zone; cooling the molten mass to a temperature below the normal boiling point of the water contained within the mass with the temperature and pressure of the confined cooling zone being maintained to prevent volatile constituents within said molten mass from forming voids within the cooled mass and to permit a continuous flow of the mass through the cooling zone; solidifying the cooled mass by extruding the cooled mass into a solidification zone maintained at a temperature below the solidification temperature of the cooled mass under soldifying conditions sufficient to provide an extrudate having a smooth surface and having a void volume of less than 0.1 void cm$^3$/cm$^3$ mass as determined upon an extrudate of a 6% by weight moisture content; piercing the solidified extrudate into the configuration of imitation food pieces; and impairing a tender texture to the imitation pieces by heating the pierced extrudate under superatmospheric pressure in the presence of a saline solution at a temperature greater than 95° C.

2. The method according to claim 1 wherein the proteinaceous material consists essentially of a leguminous proteinaceous material having a protein content of at least 70% by weight.

3. The method according to claim 2 wherein the proteinaceous material and water are converted to a molten mass at a temperature ranging from about 135° C. to about 155° C.

4. The method according to claim 1 wherein the molten mass is cooled in the cooling zone maintained at a temperature ranging from about 45° C. to about 90° C. into a continuous sheet of a thickness ranging from about 0.05 to about 0.25 inch and the pH of the saline solution ranges from about 5.5 to about 6.5.

5. The method according to claim 4 wherein the proteinaceous material consists essentially of soy protein concentrate and the molten mass contains from about 115 to about 125 parts by weight water for each 100 parts by weight soy concentrate.

6. The method according to claim 5 wherein the molten mass is channeled through a preforming zone into the cooling zone under laminar flow conditions sufficient to provide an extrudate which when hydrated with water is characterized as being comprised of a plurality of lamina oriented substantially parallel along the longitudinal axis of the extrusion with the average thickness of the lamina within the hydrated extrudate measuring less than 0.3 mil.

7. The method according to claim 6 wherein the pieces are immersed in a packing brine containing from about 0.15M to about 0.25M sodium chloride, flavoring additive and an edible acid in an amount sufficient to adjust the pH of the pieces and packing brine to a pH ranging from about 5.8 to about 6.3 within a sealed container, and the pieces are cooked at a retorting temperature ranging from about 115° C. to about 135° C.

8. The method according to claim 1 wherein the imitation food pieces constitute an imitation mushroom product and wherein said product is retorted in the presence of a saline solution which contains a sufficient amount of mushroom flavoring to impart a mushroom taste to the retorted product.

9. The method according to claim 7 wherein the packing brine contains a sufficient amount of seafood flavoring to impart a seafood flavor to the retorted product.

10. The method according to claim 1 wherein the steps of forming the fluid molten mass, cooling same and extruding same into the solidification zone are conducted using an extruder and wherein said extruder is designed and operated in a fashion such that its power requirement during the preparation of said extrudate represents less than a 100% operational increase over the amount of power required to operate same on a no-load, empty extruder basis.

11. The method of claim 10 wherein said extruder is operated such that its power requirement during operation is less than 30% higher than its no-load operating power requirement.

12. The method of claim 10 wherein the power requirement of said extruder during operation is between about 5 and about 20% higher than its no-load operating power requirement.

13. A method for preparing tender, non-fibrous cooked food pieces from a proteinaceous material, said method comprising:
(a) forming a mixture comprising said proteinaceous material and at least about 110 parts by weight of water per 100 parts by weight of said proteinaceous material;
(b) converting said mixture into a molten homogeneous mass by subjecting same, at superatmospheric pressure and at a temperature of from about 130° C. to about 160° C., to mechanical working, shearing and frictional forces which are sufficient to form said molten homogeneous mixture but which are insufficient to impart a tough, fibrous meat-like character to the solidified extrudate material resulting in step (d) below;
(c) moving said molten homogeneous mass into a confined cooling zone and cooling same therein to a temperature which is above the solidification temperature of said mass and which is below the atmospheric boiling point of the water contained within said mass while maintaining said mass at a superatmospheric pressure sufficient to prevent the formation of voids within the cooled mass;
(d) solidifying the cooled mass by extruding same into a solidification zone maintained at a temperature below the solidification temperature of said cooled mass under solidifying conditions sufficient to provide an extrudate having a smooth surface and a void volume of less than 0.1 void $cm^3/cm^3$ mass as determined at an extrudate moisture content of 6% by weight;
(e) forming the solidified extrudate into the configuration of imitation food pieces; and
(f) cooking said imitation food pieces in a saline solution under superatmospheric pressure and at a temperature greater than 95° C. for a time sufficient to impart a tender texture thereto.

* * * * *